(12) United States Patent
Shiraishi

(10) Patent No.: US 11,303,769 B2
(45) Date of Patent: Apr. 12, 2022

(54) IMAGE PROCESSING SYSTEM THAT COMPUTERIZES DOCUMENTS WITH NOTIFICATION OF LABELED ITEMS, CONTROL METHOD THEREOF, AND STORAGE MEDIUM

(71) Applicant: CANON KABUSHIKI KAISHA, Tokyo (JP)

(72) Inventor: Kenichi Shiraishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/147,168

(22) Filed: Jan. 12, 2021

(65) Prior Publication Data
US 2021/0227083 A1    Jul. 22, 2021

(30) Foreign Application Priority Data

Jan. 21, 2020    (JP) .............................. JP2020-007532

(51) Int. Cl.
*H04N 1/00*    (2006.01)
*G06K 9/00*    (2022.01)
*H04N 1/32*    (2006.01)

(52) U.S. Cl.
CPC ..... *H04N 1/00461* (2013.01); *G06K 9/00442* (2013.01); *H04N 1/32106* (2013.01); *G06K 2209/01* (2013.01)

(58) Field of Classification Search
None
See application file for complete search history.

(56) References Cited

U.S. PATENT DOCUMENTS

| 2012/0120444 A1* | 5/2012 | Hirohata | G06K 9/42 |
| | | | 358/1.15 |
| 2019/0197303 A1* | 6/2019 | Kanada | H04N 1/00413 |
| 2020/0336613 A1 | 10/2020 | Shiraishi | H04N 1/00411 |

FOREIGN PATENT DOCUMENTS

JP    2019-115011    7/2019

* cited by examiner

*Primary Examiner* — Andrew H Lam
(74) *Attorney, Agent, or Firm* — Venable LLP

(57) ABSTRACT

To enable a user to easily grasp a correspondence relationship between a text block and a setting item on a UI screen having a preview pane and a property pane. In a case where an operation event of a selection operation for one of text blocks within a scanned image preview-displayed in the preview pane is detected, a label is displayed for the text block, which indicates a setting item with which the text block for which the operation event has been detected is associated among the setting items displayed in the property pane.

11 Claims, 11 Drawing Sheets

■ FileName

Customer Name
[ + ] Please select an OCR region.

Date
[ + ] Please select an OCR region.

■ Metadata

Company Name
[ + ] Please select an OCR region.

Address
[ + ] Please select an OCR region.

[ Cancel ]  [ Register ]

401

Preview
Please select any setting items first in Property pane.

PURCHASE ORDER

Date: 11/27/2019

Company Name:  XYZ Corporation
Address:        1 Pumpkin Road, New York, NY
Phone:          (123)456-7890

Total Quantity :   25
Total Price($) :   2,150.00

(0,0)
x → START POINT COORDINATES
y ↓

421 → PURCHASE ORDER
422 → Company Name:
423 → XYZ Corporation
424 → Date: 11/27/2019

FIG.5

FIG. 10

IMAGE PROCESSING SYSTEM THAT COMPUTERIZES DOCUMENTS WITH NOTIFICATION OF LABELED ITEMS, CONTROL METHOD THEREOF, AND STORAGE MEDIUM

BACKGROUND OF THE INVENTION

Field of the Invention

The present disclosure relates to a graphical user interface (GUI) at the time of computerizing a document and making use of the computerized document.

Description of the Related Art

Conventionally, it has been performed to extract a character string by performing optical character recognition processing (OCR processing) for a scanned image obtained by scanning a business form, such as an order sheet, and make use of the character string as a file name or the like. Japanese Patent Laid-Open No. 2019-115011 has disclosed a technique to automatically generate a file name by extracting a character string including a specific key from character strings included within a document image and present the file name to a user along with a preview display of the document image. With this technique, it is possible for a user to easily set a file name while checking the document image. Then, it is also performed to save and manage a character string extracted from a scanned image as metadata and make use of the metadata as a file name or the like As the configuration of a UI screen of an application at the time of setting a file name or metadata by using a recognized character string obtained by OCR processing, a two-pane configuration including a preview pane and a property pane is well known. Here, the preview pane is an area for preview-displaying a computerization-target scanned image and the property pane is an area for displaying contents of a property, such as a file name and metadata, in a list. In a case where a document, such as an order sheet or a bill, is computerized, a plurality of character areas (text blocks) is included in the scanned image and it is possible for a user to visually recognize each text block by the preview pane. Further, by the property pane, it is possible for a user to check the contents of a variety of setting items, such as "Customer Name", "Date", and "Address". For example, it is assumed that a user selects a text block of "XYZ Corporation" within the preview pane for a setting item of "Customer Name" within the property pane on the above-described two-pane configuration UI screen. As a result of that, the recognized character string "XYZ Corporation" within the scanned image is saved in association with the setting item "Customer Name". In this case, on a condition that a plurality of text blocks exists within the preview pane and a plurality of setting items exists also within the property pane, it is difficult for a user to immediately grasp which block is associated with which setting item.

The present disclosure has been made in view of the above-described problem and an object is to make it possible for a user to easily grasp the correspondence relationship between a text block and a setting item on a UI screen having a preview pane and a property pane

SUMMARY OF THE INVENTION

The image processing system that computerizes a document according to the present disclosure includes: a memory that stores a program; and a processor that executes the program to perform: displaying a user interface screen for setting a property to a scanned image obtained by scanning the document; and controlling a display on the user interface screen, and on the user interface screen, at least a preview pane that is an area preview-displaying the scanned image and a property pane that is an area to which a setting value of each setting item of the property is input exist and the controlling performs, in a case where an operation event of a selection operation for one of text blocks within the scanned image preview-displayed in the preview pane is detected, displaying a label for the text block, which indicates a setting item with which the text block for which the operation event has been detected is associated among the setting items displayed in the property pane.

Further features of the present invention will become apparent from the following description of exemplary embodiments with reference to the attached drawings.

BRIEF DESCRIPTION OF THE DRAWINGS

FIG. 4A is a diagram explaining a state transition of a UI screen and

FIG. 4B is a diagram explaining an orthogonal coordinate system;

FIG. 5 is a diagram explaining a state transition of a UI screen;

FIG. 8 is a diagram explaining a state transition of a UI screen;

FIG. 10 is a diagram explaining a state transition of a UI screen; and

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
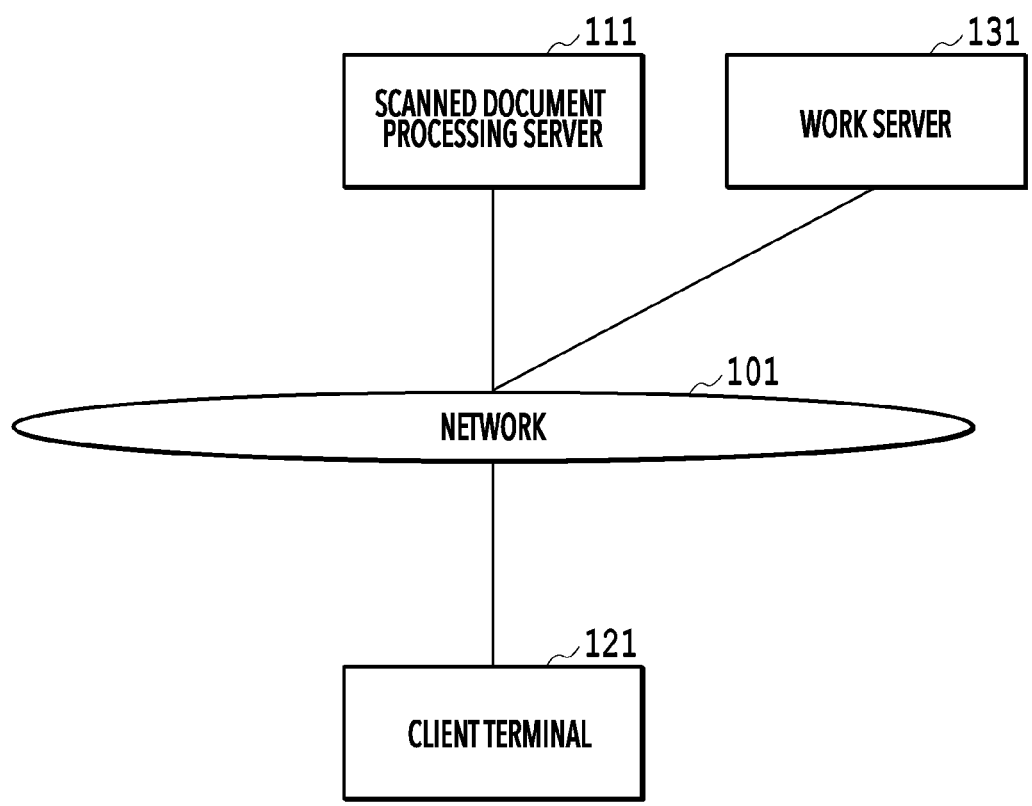
FIG. 1 is a diagram showing an entire configuration of an image processing system.

<System Configuration>
FIG. 1 is a diagram showing the entire configuration of an image processing system that computerizes a document according to the present embodiment. The image processing system includes a scanned document processing server 111, a client terminal 121, and a work server 131. The client terminal 121 is connected with the scanned document processing server 111 and the work server 131 so as to be capable of communication via a network 101, such as an internet and an intranet. The client terminal 121 may be an MFP (Multifunction Peripheral) and the like comprising the scanner function, in addition to a personal computer, a laptop computer, a tablet computer, a smartphone and the like. The configuration of the image processing system shown in FIG. 1 is an example and the configuration is not limited to this. For example, it may also be possible for the client terminal 121 to have the function of the scanned document processing server 111. In the following explanation, a scanned image obtained by scanning a processing-target document, such as an estimate form, is called "scanned document".

<Hardware Configuration>

Figure 2:
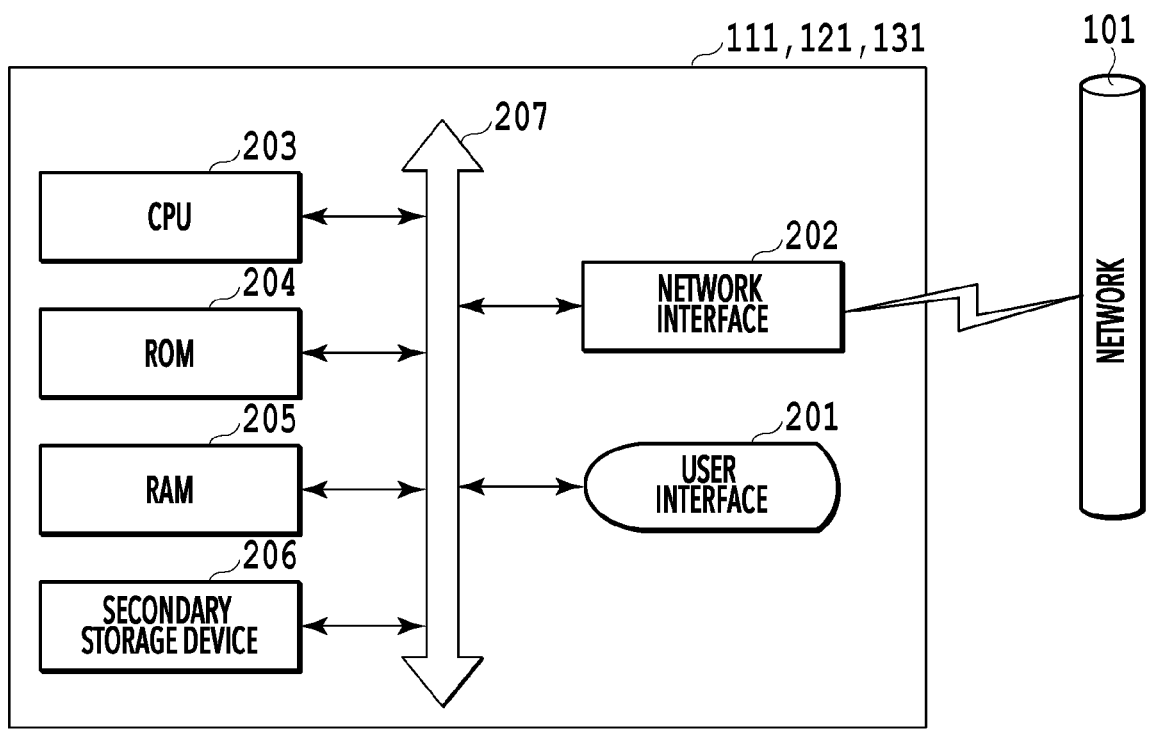
FIG. 2 is a block diagram showing a hardware configuration of an information processing apparatus.

FIG. 2 is a block diagram showing the hardware configuration of the scanned document processing server 111, the client terminal 121, and the work server 131, each as an information processing apparatus. A user interface (UI) 201 is implemented by a display, a keyboard, a mouse, a button, a touch panel and the like and inputs and outputs information and signals. It is also possible for a computer not comprising the hardware such as this to connect and operate from another computer by a remote desktop, a remote shell and the like. A network interface 202 connects to the network 101 and performs communication with another information processing apparatus and a network device, not shown schematically. The communication method may be wired or wireless. A CPU 203 is a computing device in charge of the control of the entire apparatus and executes programs read from a ROM 204, a RAM 205, a secondary storage device 206 and the like. The ROM 204 stores incorporated programs and various kinds of data. The RAM 205 temporarily stores various kinds of data and also functions as a work memory of the CPU 203. The secondary storage device 206 is a large-capacity storage device represented by an HDD and a flash memory. Each of the units described above is connected to one another via an input/output interface 207.

<Software Configuration>

Figure 3:
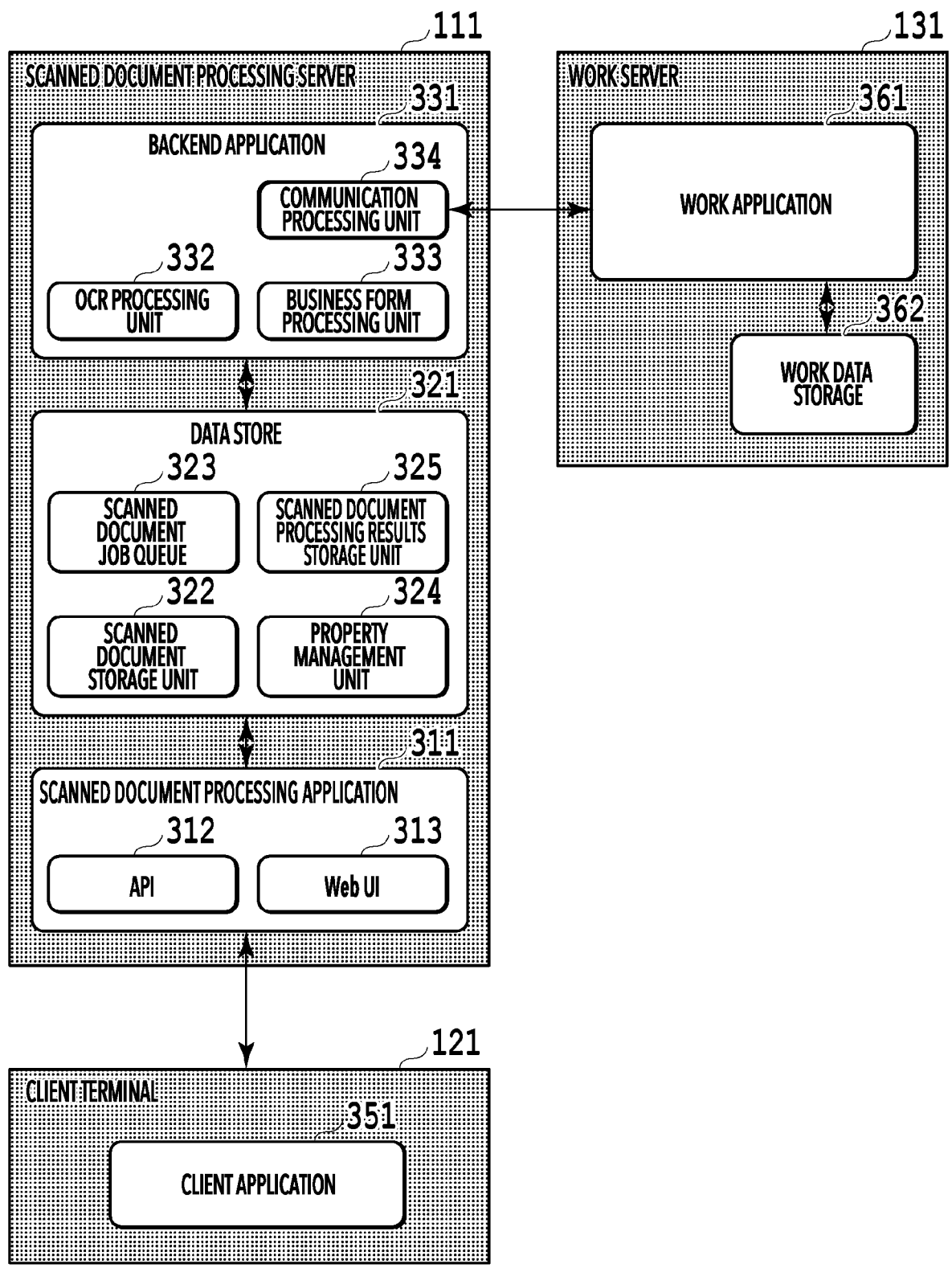
FIG. 3 is a diagram showing a software configuration of the image processing system.

FIG. 3 is a diagram showing the software configuration of the image processing system according to the present embodiment. Each piece of software is installed in the scanned document processing server 111, the client terminal 121, and the work server 131, respectively, described above and executed by the CPU 203 of each apparatus. In the following, each piece of software is explained.

<<Software of Scanned Document Processing Server>>

A scanned document processing application 311 is a Web application installed in the scanned document processing server 111. However, the scanned document processing application 311 may be in an application mounting form other than a Web application. An API 312 is an API (Application Programming Interface) provided by the scanned document processing application 311. A Web UI 313 is a Web user interface provided by the scanned document processing application 311.

A data store 321 is a storage area saving and storing data that is used by the scanned document processing application 311 or a backend application 331, to be described later. In the data store 321, a scanned document storage unit 322, a scanned document job queue 323, a property management unit 324, and a scanned image processing results storage unit 325 exist. The scanned document storage unit 322 files the data of a scanned image itself and saves as an image file, such as JPEG, or a document file, such as PDF (Portable Document Format). The scanned document job queue 323 stores a queue managing jobs to be subjected to property input processing, to be described later. The property management unit 324 stores information relating to properties, such as a file name, a folder path, and metadata, which need to be attached for each scanned document. Specifically, the property management unit 324 manages a list of setting items and a format of a name or a value (character string, figure and the like) for each setting item, various kinds of information stored for each setting item, to be described later, and the like. The scanned document processing results storage unit 325 stores OCR processing results and business form determination results. Further, the scanned document processing results storage unit 325 stores character area information (text block information) associated with a setting item, a set value and the like for each scanned document.

The backend application 331 is an application for performing background processing. The backend application 331 is an application in charge of various kinds of processing that may be performed sequentially on the background, specifically, OCR processing, business form processing, and communication processing. An OCR processing unit 332 acquires a processing-target scanned document from the scanned document storage unit 322 and performs OCR processing for the acquired scanned document. In the OCR processing, information specifying each text block (specifically, information on the start point coordinates, width, height of a rectangular area) and information on a recognized character string of each text block are extracted. A business form processing unit 333 determines the type of the scan-target document (business form) by using the information on the processing-target scanned document, the arrangement pattern of text blocks and the recognized character strings, which are obtained by the OCR processing. This determination processing may be any method, such as pattern recognition and machine learning. A communication processing unit 334 performs processing to transmit a scanned document and analysis processing results thereof to the work server 131, which is an external apparatus. In a case where it is not necessary to transmit a scanned document and analysis processing results thereof, the communication processing unit 334 may be omitted.

<<Software of Client Terminal>>

A client application 351 performs the Web application of the above-described scanned document processing application 311. For example, the client application 351 performs the Web application by displaying the Web UI 313 by a Web browser and performing transmission and reception of necessary data with the API 312.

<<Software of Work Server>>

A work application 361 is an application for assisting various kinds of work in a company, such as file management, document management, order reception, and accounting. A work data storage 362 saves various kinds of data used by the work application 361. The work application 361 receives results of processing by the scanned document processing server 111 and performs necessary processing for the results and stores the results.

<UI Screen of Client Application>

Following the above, a user interface screen (hereinafter, described as "UI screen") that is displayed on the user interface 201 of the client terminal 121 is explained. FIG. 4A shows an example of a UI screen that is displayed on the user interface 201 by the client application 351 according to the present embodiment.

The UI screen shown in FIG. 4A has a two-pane configuration of a Preview pane 401 and a Property pane 411. Here, within the Preview pane 401, a page image 402 of a scanned document of "PURCHASE ORDER" is preview-displayed. In the Preview pane 401, it is possible to display any position in the page image 402 by scrolling or zooming the page image 402. The Property pane 411 is a pane for displaying and editing a property to be attached to the processing-target scanned image. Items that are set as properties include master items, such as "FileName", "Folder Path", and "Metadata", and slave items, such as "Company Name", "Date", and "Address", which are elements configuring the master items.

The UI screen in FIG. 4A is an example in a case where the business form type of the processing-target scanned document is determined to be "PURCHASE ORDER" in the business form determination processing. Here, within the Property pane 411, as setting items (master items) to be attached to the scanned image, two of "FileName" and "Metadata" are displayed. Then, for "FileName", two setting items (slave items) of "Customer Name" and "Date" are displayed. Further, for "Metadata", two setting items of "Company Name" and "Address" are displayed. In the following explanation, the slave item of a file name is called "file name item" and the slave item of metadata is called "metadata item".

FIG. 4B is a diagram explaining an orthogonal coordinate system indicating a relationship between the page image 402 and each text block. In FIG. 4B, four text blocks 421, 422, 423, and 424 exist. In the page image 402, there are more text blocks, but their explanation is omitted here. The text block detected by OCR processing is identified respectively by the start point coordinates, width, and height as shown by a hatched rectangle. For example, the text block 423 corresponding to the character string of "XYZ Corporation" is represented as "Start point coordinates (1200, 700)", "Width; 720" and "Height: 120" in units of pixels.

Figure 5:
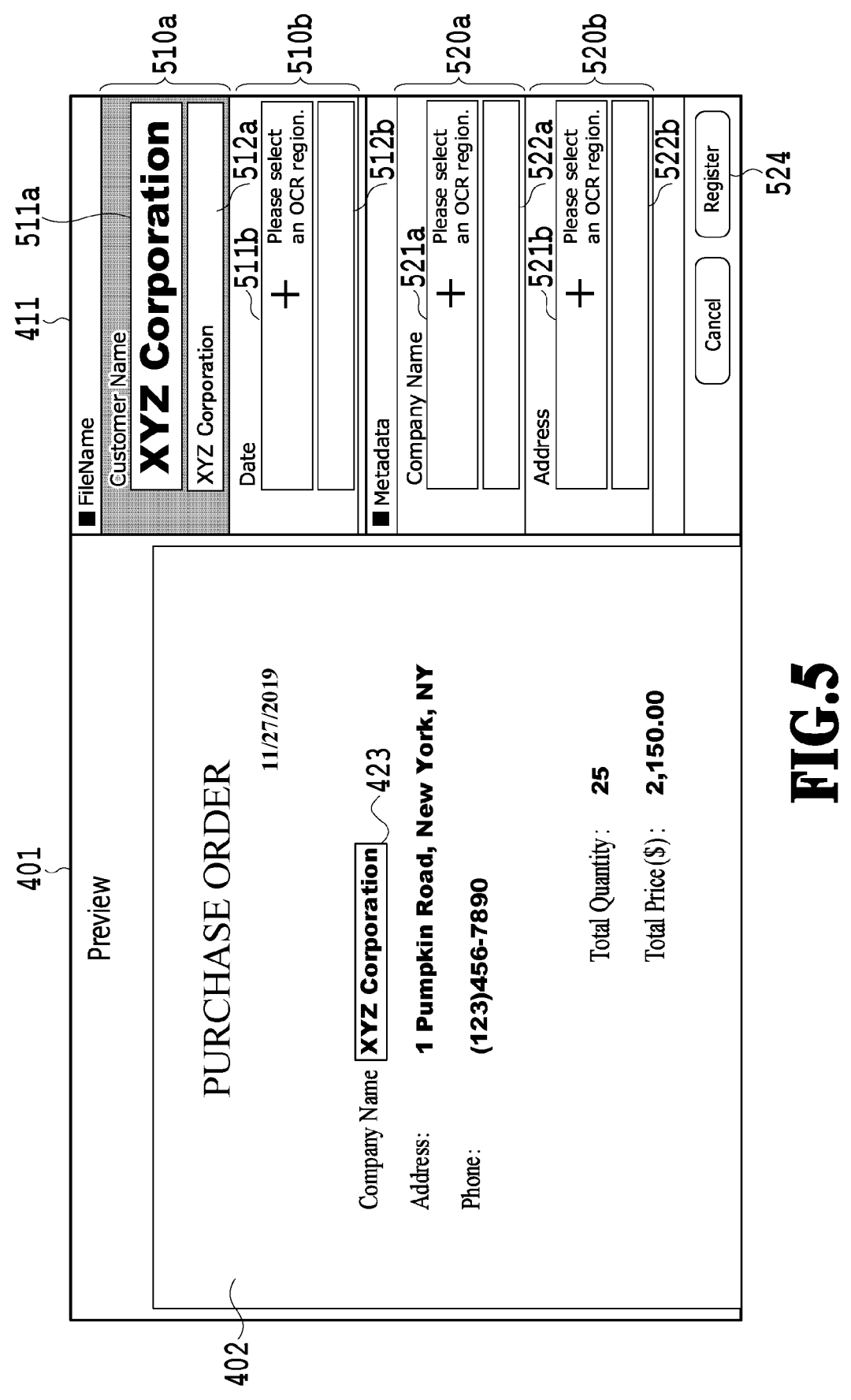

FIG. 5 is a diagram explaining the way a text block within the page image 402 is associated with each slave item for the two master items "FileName" and "Metadata" on the UI screen in FIG. 4A. Here, the state is such that the text block 423 corresponding to the character string of "XYZ Corporation" within the page image 402 and the file name item "Customer Name" are associated with each other. Then, in order to enable a user to easily identify, on the text block 423, for example, a colored rectangle is displayed in a transparent and superimposing manner. It may also be possible to display a colored frame line in a superimposing manner in place of the transparent and superimposing display. Horizontally elongated rectangles 510a, 510b, 520a, and 520b within the Property pane 411 are display fields in which setting values and the like of each slave item are displayed and edited for each master item, such as the file name and the metadata. Then, horizontally elongated rectangles 511a, 511b, 521a, and 522b within each display field are areas (cut-out image areas) in which an image (image cut out from the page image 402) of a portion corresponding to the text block selected by a user is displayed. In the example in FIG. 5, the text block 423 is associated with the file name item "Customer Name", and therefore, in the cut-out image area 511a, the partial image of the text block 423 is displayed. In the stage in which association with any text block is not performed yet, a "+" button is displayed as in the cut-out image areas 511b, 521a, and 521b. Horizontally elongated rectangles 512a, 512b, 522a, and 522b located under each of the cut-out image areas are each an editing area to which the recognized character string included in the text block relating to user selection is input and it is possible for a user to edit the input recognized character string with a soft keyboard or the like, not shown schematically.

<UI Screen Control Processing>

Figure 6:
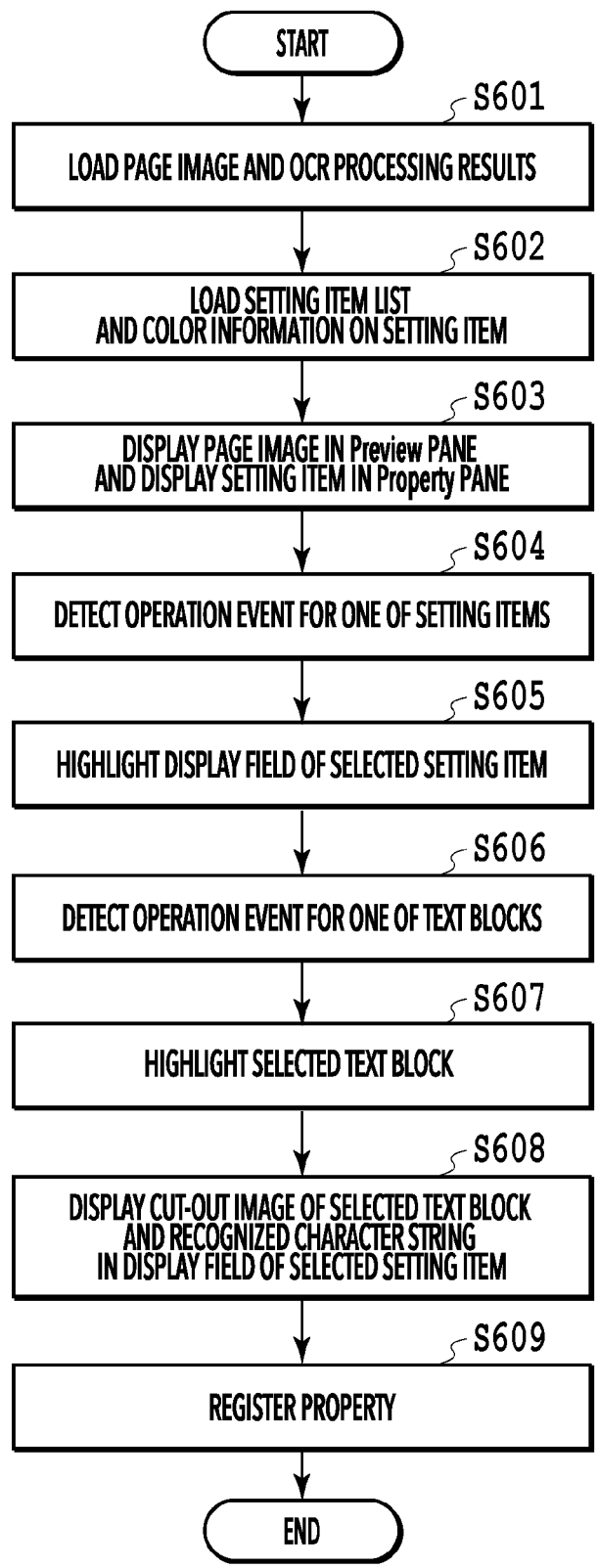
FIG. 6 is a flowchart showing a flow of UI screen control processing.

Next, control processing to associate a text block with each metadata item on the UI screen described above, which is performed by the client application 351 of the client terminal 121, is explained by using the flowchart in FIG. 6. Prior to the start of execution of the flow shown in FIG. 6, first, a queue of jobs to be processed is provided to the client application 351 by the scanned document processing application 311 of the scanned document processing server 111. In a case where a user selects a job of a scanned document for which the user desires to start processing by using the client application 351, the scanned document processing application 311 acquires necessary information corresponding to the selected scanned document from the data store 321. Specifically, the scanned document processing application 311 acquires the corresponding image file from the scanned document storage unit 322 and acquires the corresponding OCR processing results and business form determination processing results from the scanned document processing results storage unit 325. Further, the scanned document processing application 311 acquires the setting item list for each business form type and allocated color information identifying a predetermined item color allocated in advance for each slave item from the property management unit 324. These pieces of acquired data are provided to the client application 351 from the scanned document processing application 311 and the flow in FIG. 6 is started. In the following explanation, symbol "S" represents a step. At S601, the data of the page image and the OCR processing results (recognized character string) is loaded, which are to be displayed within the Preview pane 401. At S602 that follows, the setting item list and the information on the color allocated to each slave item are loaded. At next S603, the contents of the data loaded at S601 and S602 are reflected on the UI screen. Specifically, the page image is displayed within the Preview pane 401 and the contents of each setting item (master item and slave item) included in the setting item list are displayed within the Property pane 411. By the processing at S601 to S603 performed so far, the state of the UI screen shown in FIG. 4A is brought about.

Then, at S604, the operation event of the selection operation of the "+" button of the cut-out image areas 511b, 521a, and 521b in one of the slave items within the Property pane 411 is detected. This selection operation is, for example, a touch operation by a user with a finger or a touch pen or a click operation with a mouse. In this manner, one slave item (here, file name item or metadata item) relating to the user selection is determined among the slave items displayed in the Property pane 411. In the following, the slave item selected by a user is called "selected slave item (selected file name item or selected metadata item)". At S605 that follows, highlighting processing to, for example, change the background color, thicken the frame, and so on is performed for the display field of the selected slave item determined at S604. By this, a user is enabled to easily identify the slave item relating to selection.

Then, at S606, the operation event of the selection operation to one of the text blocks existing in the page image 402 within the Preview pane 401 is detected. In this manner, one arbitrary text block is selected from among one or a plurality of text blocks included in the page image. In the following, the text block selected by a user is called "selected text block". At S607 that follows, highlighting processing to, for example, attach a frame for which coloring is performed, and so on is performed for the selected text block determined at S606. By this, a user is enabled to easily identify the selected text block. Then, at S608, the cut-out image corresponding to the selected text block is displayed in the cut-out image area within the selected metadata item and the recognized character string included in the selected text block is displayed within the editing area of the selected metadata item. By the processing at S604 to S608 performed so far, the state of the UI screen as shown in FIG. 5 is brought about in a case where a text block is selected for the slave item "Customer Name". That is, the setting item selected by a user and the text block are associated with each other and which text block is used to input the character string used for the selected setting item is determined.

In a case where the above processing is completed for all the setting items within the setting item list and a "Register" button 524 is selected by an operation of a user, at S609, a request to register properties, such as a file name, is transmitted to the scanned document processing server 111. In this property registration request, information associating edited values in all the setting items and the text blocks with each other is included. In the scanned document processing server 111, the scanned document processing application 311 saves the above-described information included in the property registration request received from the client terminal 121 in the scanned document processing results storage unit 325. At this time, in a case where the registration of the property is performed in the external work server 131, the property registration request is transferred to the work server 131 via the communication processing unit 334. After all the necessary processing is completed, the scanned document processing application 311 dequeues the queue from the scanned document job queue 323. In this manner, this processing is completed.

The above is a rough flow of the UI screen control processing in the client application 351 according to the present embodiment.

<<UI Control in a Case Where Already-Associated Text Block Is Selected>>

Figure 7:
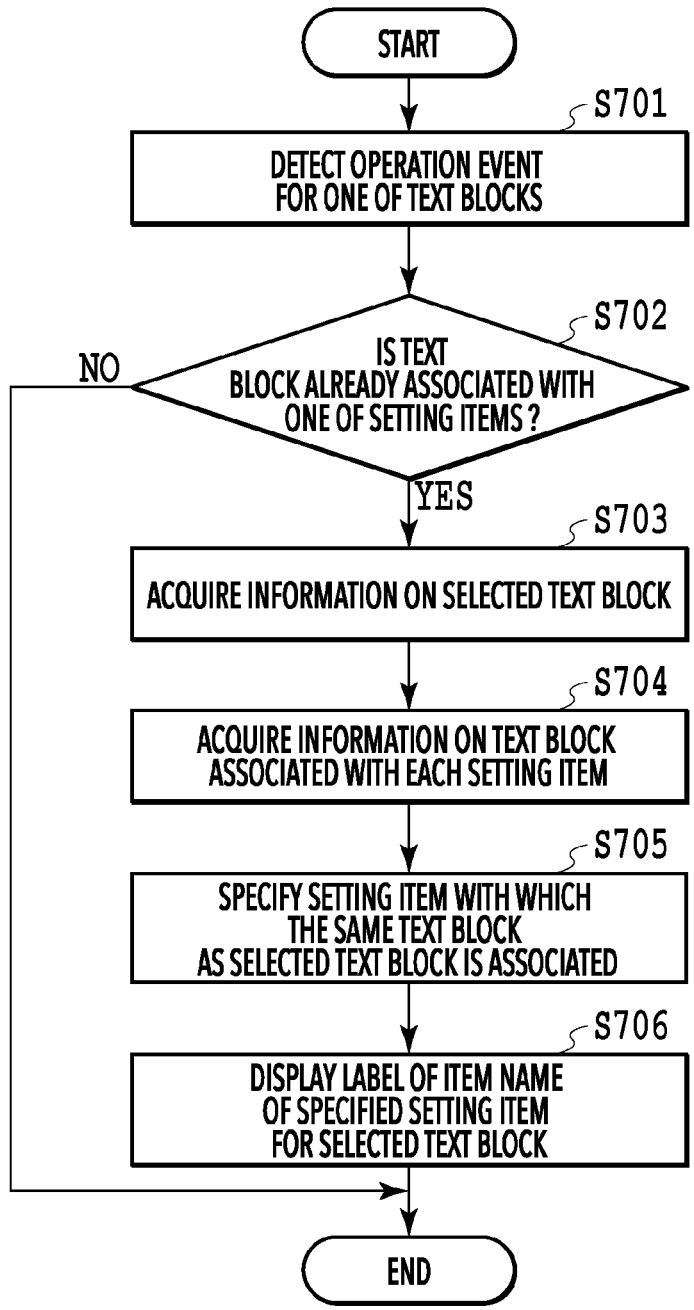
FIG. 7 is a flowchart showing a flow of UI screen control processing.

Following the above, the UI control processing in a case where a user has performed the selection operation for a text block within the preview pane before the registration processing at S609 described above is performed is explained by using the flowchart in FIG. 7. Here, it is assumed that the text block 423 is associated with the slave item "Customer Name" of the master item "FileName" in accordance with the flow in FIG. 6 described above and the state of the UI screen shown in FIG. 5 described previously is brought about.

It is assumed that the selection operation is performed for one of the text blocks within the Preview pane 401 in the situation in which the UI screen is in the state shown in FIG. 5. The selection operation here may be the operation to hover a finger or a touch pen directly above a text block or the operation to place a mouse over a text block, in addition to the touch operation with a finger or the like and the click operation with a mouse. The hover operation is an operation that is regarded as touching a button or the like located directly under a finger in the state where the finger is separate from the touch panel. Further, the mouse over operation refers to an operation to place the cursor on a button or the like.

At S701, the operation event of the above-described selection operation by a user is detected. Here, it is assumed that the operation event for the text block 423 of "XYZ Corporation" is detected. At S702 that follows, whether or not a setting item already associated with the text block selected by a user exists is determined. In a case where the determination results are "No", this processing is terminated. On the other hand, in a case where the determination results are "Yes", the processing advances to S703. Here, the setting item (master item "FileName", slave item "Customer Name") is already associated with the text block 430 of "XYZ Corporation" selected by a user. Consequently, the determination results in this case are "Yes" and the processing advances to S703.

At S703, information relating to the selected text block is acquired. Specifically, coordinates information capable of specifying the position (for example, coordinates information on the start point position of the block), size information capable of specifying the size (for example, information on width and height), and information on the recognized character string obtained by the OCR processing are included. Here, as the information on the text block 423, "Start point coordinates (1200, 700)", "Width; 720", "Height: 120", and "Recognized character string: XYZ Corporation" are acquired.

At S704 that follows, for each setting item within the Property pane 411, the information on the start point coordinates, the width, and the height of the already-associated text block and the information on the recognized character string are acquired for each setting item. Here, on the UI screen shown in FIG. 5, the setting item whose association with the text block has already been completed and whose character string is displayed within the editing area is only the setting item "Customer Name". Consequently, the information on the text block 423 associated with the setting item (that is, the same information as the information acquired at S703) is acquired.

At next S705, among the setting items within the Property pane 411, the setting item with which the same text block as the selected text block is already associated is specified. At the time of this specification, the information acquired at S703 and the information acquired at S704 are compared. Then, the setting item associated with the text block whose information matches with the information acquired at S703 is specified. Here, the setting item "Customer Name" already associated with the text block 423 is specified.

Then, at S706, for the selected text block, a label indicating the setting item specified at S705 is displayed. At this time, in a case where the selection operation detected at S701 is the hover operation or the mouse over operation, the label is displayed in the so-called tool-tip format only while a finger or a cursor stays over the text block. The UI screen shown in FIG. 8 shows the state where the label is displayed in the shape of a balloon above the text block 423, which is the selected text block, with a predetermined distance being in between. Here, the text block is already associated with the slave item "Customer Name" of the master item "FileName", and therefore, a label 801 including the character string "Customer Name" is displayed as the label indicating the fact. The display position and the shape of the label are arbitrary and what is required for the label is to be capable of enabling a user to recognize that the label is displayed for the selected text block. Further, in the example in FIG. 8, as the contents of the label display, only the name of the slave item is displayed, but it may also be possible to display the contents of the master item together (or in place of the slave item).

Figure 9A:
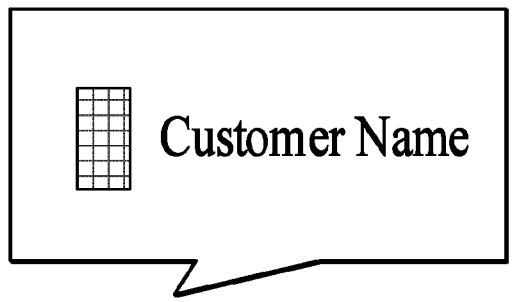
FIG. 9A to FIG. 9C are each a diagram showing an example in a case where unique information associated with a setting item is displayed together with an item name.
Figure 9B:
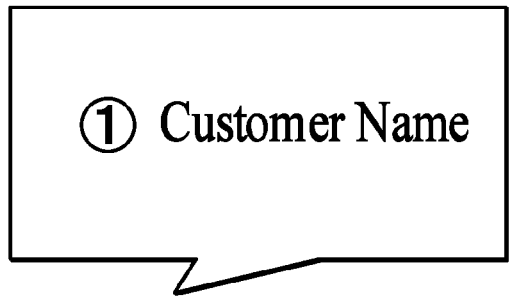
Figure 9C:
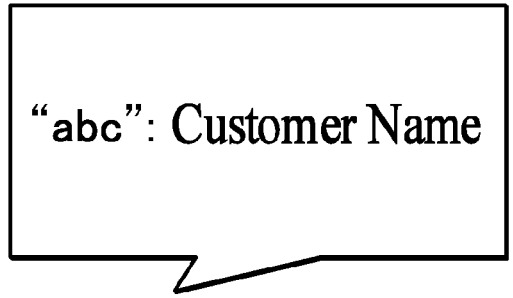
Figure 10:
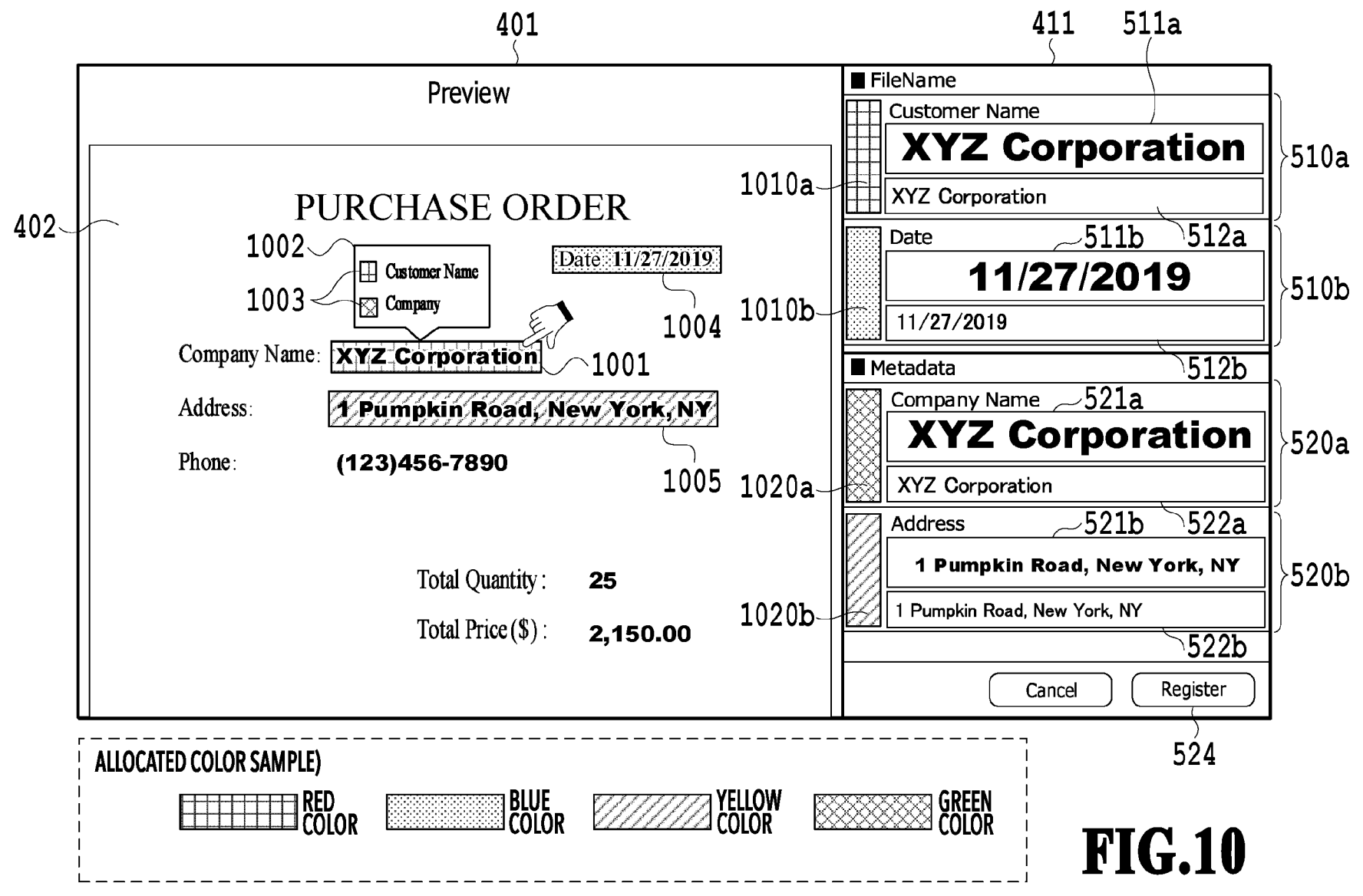

Further, it may also be possible to display the item color allocated to each item by providing item color areas 1010a, 1010b, 1020a, and 1020b within each of the display fields 510a, 510b, 520a, and 520b as in FIG. 10. In that case, it may also be possible to display the setting item associated with the selected text block and the item color thereof as in FIG. 9A as the label 801 in FIG. 8. Further, it may also be possible to display an identifier (figure indicating a number, arbitrary character string (ID)) for identifying each item to each of the display fields 510a, 510b, 520a, and 520b in place of the item color area. In that case, it may also be possible to display a unique identifier associated with each setting item together with the item name as shown in FIG. 9B and FIG. 9C as the label 801 in FIG. 8. FIG. 9B shows a label to which a FIG. allocated to the setting item in order is added and FIG. 9C shows a label to which a character string identifying the setting item is added, respectively.

The UI screen shown in FIG. 10 shows an example of a label display in a case where a user performs the selection operation of the text block in the situation in which one text block is associated with a plurality of different setting items. In the example in FIG. 10, a text block 1001 including the character string "XYZ Corporation" is associated with two slave items of "Customer Name" and "Company Name". Consequently, a label 1002 indicating that the text block 1001 is associated with these two setting items is displayed. Then, in this label 1002, in addition to each item name of the two setting items, a patch 1003 indicating the unique item color allocated to each setting items also exists. By displaying the label such as this, it is possible for a user to easily grasp the correspondence relationship between the text block and the setting item also in a one-to-N association.

Further, on the UI screen shown in FIG. 10, within each of the display fields 510a, 510b, 520a, and 520b, the item color areas 1010a, 1010b, 1020a, and 1020b each displaying the color (item color) allocated to each setting item for enabling a user to identify the color exist. In the example in FIG. 10, each of the text block 1001 and text blocks 1004 and 1005 is colored in the color allocated to the associated setting item. The text block 1001 is associated with the two setting items ("Customer Name", "Company Name"), and therefore, the text block 1001 is colored in one item color of the two setting items. In the example in FIG. 10, the text block 1001 is colored in the item color of the setting item (Customer Name) displayed at the uppermost position in the list of the plurality of setting items displayed in the Property pane 411, but this is not limited. For example, it may also be possible to color the text block 1001 in the item color of the setting item displayed at the lowermost position in the list. Further, it may also be possible to display the item colors of a plurality of associated setting items. For example, it may also be possible to divide the text block 1001 into a stripe shape and color the divided text block 1001 in the item colors of a plurality of setting items (for example, the upper half of the text block 100 is colored in the item color of Customer Name and the lower half is colored in the item color of Company Name).

<<UI Control in a Case Where Already-Associated Setting Item Is Selected>>

Figure 11:
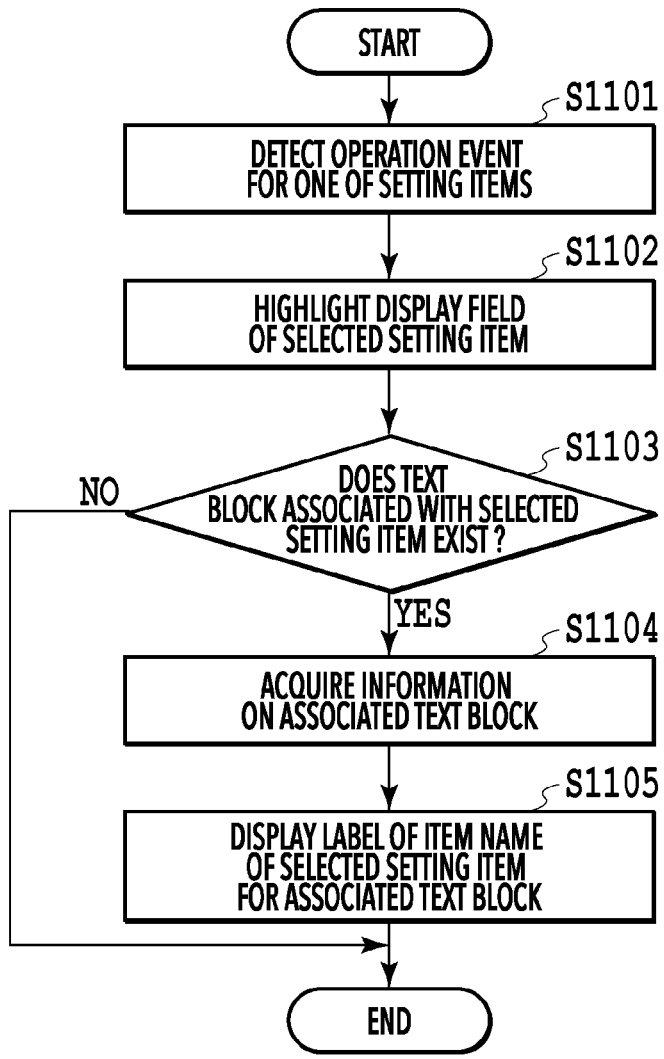
FIG. 11 is a flowchart showing a flow of UI screen control processing.

Following the above, the UI control processing in a case where a user has performed the selection operation for a setting item within the property pane before the registration processing at S609 described above is performed is explained by using the flowchart in FIG. 11. Here also, it is assumed that the text block 423 is associated with the slave item "Customer Name" of the master item "FileName" in accordance with the flow in FIG. 6 described above and the state of the UI screen shown in FIG. 5 described previously is brought about.

It is assumed that the selection operation is performed for one of setting items within the Property pane 411 in the situation in which the UI screen is in the state shown in FIG. 5. The selection operation here may also be the operation to hover a finger or a touch pen directly above a setting item or the operation to place a mouse over a setting item, in addition to the touch operation with a finger or the like and the click operation with a mouse.

At S1101, the operation event of the selection operation described above by a user is detected. Here, it is assumed that the operation event for the cut-out image area 511a of the setting item "Customer Name" is detected. At S1102 that follows, the display field of the selected setting item is highlighted. Here, the display field 501a of the slave item "Customer Name", which is the selected setting item, is highlighted.

At S1103, whether or not a text block already associated with the setting item selected by a user exists is determined. In a case where the determination results are "No", this processing is terminated. On the other hand, in a case where the determination results are "Yes", the processing advances to S1104. Here, with the setting item "Customer Name" selected by a user, the text block 423 including the character string "XYZ Corporation" is already associated. Consequently, the determination results in this case is "Yes" and the processing advances to S1104.

At S1104, information relating to the text block associated with the selected setting item, specifically, information on the start point coordinates, the width, and the height, and information on the recognized character string are acquired. Here, as the information on the text block 423, "Start point coordinates (1200, 700)", "Width: 720", "Height: 120", and "Recognized character string: XYZ Corporation" are acquired.

At S1105 that follows, as at S706 described previously, based on the information acquired at S1104, a label indicating the selected setting item is displayed for the text block associated with the selected setting item. At this time, in a case of a situation in which a plurality of setting items is associated with the text block associated with the selected setting item, like the label 1002 in FIG. 10, the label displays a plurality of setting items associated with the text block.

The above is the details of the UI screen control processing in the client application 351 according to the present embodiment.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible for a user to easily grasp a correspondence relationship between a text block and a setting item on a UI screen having a preview pane and a property pane.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-007532, filed Jan. 21, 2020 which is hereby incorporated by reference wherein in its entirety.

What is claimed is:

1. An image processing system that computerizes a document, comprising:
   a memory that stores a program; and
   a processor that executes the program to perform:
   displaying a user interface screen for setting a property to a scanned image obtained by scanning the document, wherein the user interface screen includes a preview pane that is an area preview-displaying the scanned image and a property pane that is an area to which setting values of setting items of the property are input; and
   associating a selected text block with one of the setting items based on a user's operation to input an OCR result of the selected text block as a setting value of the one of the setting items of the property, wherein the selected text block is selected within the preview-displayed scanned image by the user,
   and wherein, if one text block is already associated with any of the setting items when the user selects the one text block within the preview-displayed scanned image, a label indicating the already associated setting item is displayed for the selected one text block within the scanned image preview-displayed in the preview pane.

2. The image processing system according to claim 1, wherein
   if the selected one text block is already associated with some setting items when the user selects the one text block within the preview-displayed scanned image, a label indicating the already associated some setting items is displayed for the selected one text block within the scanned image preview-displayed in the preview pane.

3. The image processing system according to claim 1, wherein
   the displayed label includes at least information on an item name of the setting item already associated with the selected one text block.

4. The image processing system according to claim 3, wherein
   the displayed label further includes an identifier of the already associated setting item.

5. The image processing system according to claim 4, wherein
   the identifier is one of a color, a figure, and a character string, allocated to each setting item.

6. The image processing system according to claim 1, wherein
   the user selects the one text block within the preview-displayed scanned image by performing a hover operation or a mouse over operation on the one text block.

7. The image processing system according to claim 1, wherein
   if one of setting items is already associated with any of text blocks when the user selects the one of setting items displayed in the property pane, a label indicating the selected one setting item is displayed for the text block already associated with the selected one setting item within the scanned image preview-displayed in the preview pane.

8. The image processing system according to claim 7, wherein
   if the user selects the one of setting items displayed in the property pane, the selected one setting item is highlighted.

9. The image processing system according to claim 1, wherein
   the property is a file name that is attached in a case where the scanned image is computerized.

10. A control method for computerizing a document, comprising:
    displaying a user interface screen for setting a property to a scanned image obtained by scanning the document, wherein the user interface screen includes a preview pane that is an area preview-displaying the scanned image and a property pane that is an area to which setting values of setting items of the property are input; and
    associating a selected text block with one of the setting items based on a user's operation to input an OCR result of the selected text block as a setting value of the one of the setting items of the property, wherein the selected text block is selected within the preview-displayed scanned image by the user, and
    wherein, if one text block is already associated with any of the setting items when the user selects the one text block within the preview-displayed scanned image, a label indicating the already associated setting item is displayed for the selected one text block within the scanned image preview-displayed in the preview pane.

11. A non-transitory computer readable storage medium storing a program for causing a computer to perform:
    displaying a user interface screen for setting a property to a scanned image obtained by scanning the document, wherein the user interface screen includes a preview pane that is an area preview-displaying the scanned image and a property pane that is an area to which setting values of setting items of the property is input; and
    associating a selected text block with one of the setting items based on a user's operation to input an OCR result of the selected text block as a setting value of the one of the setting items of the property, wherein the selected text block is selected within the preview-displayed scanned image by the user, and
    wherein, if one text block is already associated with any of the setting items when the user selects the one text block within the preview-displayed scanned image, a label indicating the already associated setting item is displayed for the selected one text block within the scanned image preview-displayed in the preview pane.

* * * * *